(12) United States Patent
Shih et al.

(10) Patent No.: US 9,749,545 B2
(45) Date of Patent: Aug. 29, 2017

(54) LIGHT COMPENSATING SYSTEM AND METHOD THEREOF

(71) Applicant: VIVOTEK INC., New Taipei (TW)

(72) Inventors: Li-Shan Shih, New Taipei (TW); Yi-Chuan Chen, New Taipei (TW); Chih-Hung Chang, New Taipei (TW); Wen-Yuan Li, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/226,796

(22) Filed: Aug. 2, 2016

(65) Prior Publication Data

US 2016/0345400 A1    Nov. 24, 2016

Related U.S. Application Data

(63) Continuation of application No. 14/481,353, filed on Sep. 9, 2014, now Pat. No. 9,439,261.

(30) Foreign Application Priority Data

Sep. 11, 2013 (TW) .............................. 102132863 A

(51) Int. Cl.
*H04N 5/235* (2006.01)
*H04N 5/225* (2006.01)
(Continued)

(52) U.S. Cl.
CPC .......... *H04N 5/2351* (2013.01); *G01J 1/4257* (2013.01); *H04N 5/2256* (2013.01);
(Continued)

(58) Field of Classification Search
CPC . H05B 33/0851; G01J 1/4257; H04B 5/2256; H04B 5/2351; H04B 5/2352; H04B 5/2354
See application file for complete search history.

(56) References Cited

U.S. PATENT DOCUMENTS

2006/0039160 A1* 2/2006 Cassarly ............... A47F 11/10
                                                        362/551
2008/0267600 A1   10/2008 Omi
(Continued)

FOREIGN PATENT DOCUMENTS

CN    103118232 A    5/2013
TW    200619811      12/2004
(Continued)

OTHER PUBLICATIONS

Intellectual Property Office, Ministry of Economic Affairs, R.O.C. "Office Action", May 13, 2015, Taiwan.

*Primary Examiner* — Tung X Le
*Assistant Examiner* — Raymond R Chai
(74) *Attorney, Agent, or Firm* — Maschoff Brennan

(57) ABSTRACT

A light compensating system in accordance with this invention comprises a plurality of light emitting devices, an image capturing device, and a processing device. The processing device is respectively coupled to the plurality of light emitting devices and the image capturing device. Each light emitting device is used for emitting light to illuminate a certain area in space. The image capturing device is used for capturing a first image, which can be defined as a plurality of image blocks. Each image block is affected by the light from at least one corresponding light emitting device. The processing device is used for analyzing a brightness value of at least one of the plurality image block and adjusting at least one light emitting device corresponding to the analyzed image block based on the brightness value.

20 Claims, 14 Drawing Sheets

(51) Int. Cl.
*G06K 9/82* (2006.01)
*G06K 9/00* (2006.01)
*G06K 9/78* (2006.01)
*H05B 33/08* (2006.01)
*G01J 1/42* (2006.01)

(52) U.S. Cl.
CPC ......... *H04N 5/2352* (2013.01); *H04N 5/2354* (2013.01); *H05B 33/0851* (2013.01)

(56) References Cited

U.S. PATENT DOCUMENTS

| | | | | |
|---|---|---|---|---|
| 2009/0175555 | A1* | 7/2009 | Mahowald | H04N 5/23232 382/274 |
| 2011/0102664 | A1* | 5/2011 | Chuang | G03B 7/16 348/370 |
| 2011/0141314 | A1 | 6/2011 | Liu et al. | |
| 2012/0213503 | A1* | 8/2012 | Gustaffson | H04N 5/2354 396/164 |
| 2014/0104305 | A1* | 4/2014 | Ryu | G09G 3/3208 345/601 |
| 2015/0138432 | A1* | 5/2015 | Takabatake | H04N 5/2256 348/370 |
| 2015/0181100 | A1* | 6/2015 | Publicover | H04N 7/18 348/78 |
| 2016/0014316 | A1* | 1/2016 | Liao | H04N 5/2354 348/223.1 |
| 2016/0088712 | A1* | 3/2016 | Kim | H05B 37/0218 315/149 |

FOREIGN PATENT DOCUMENTS

| | | |
|---|---|---|
| TW | I357259 B1 | 1/2012 |
| TW | 201017101 A1 * | 10/2012 |
| TW | 201304528 A | 1/2013 |

* cited by examiner

LIGHT COMPENSATING SYSTEM AND METHOD THEREOF

CROSS-REFERENCE TO RELATED APPLICATIONS

This application is a continuation patent application of U.S. application Ser. No. 14/481,353, filed on Sep. 9, 2014, the entire contents of which are hereby incorporated by reference for which priority is claimed under 35 U.S.C. §120. The U.S. application Ser. No. 14/481,353 is a non-provisional application claims priority to Patent Application No. 102132863 filed in Taiwan, R.O.C on Sep. 11, 2013, which is incorporated by reference herein in its entirety.

BACKGROUND OF THE INVENTION

Technical Field of the Invention

The present disclosure relates to a light compensating system and a method thereof, particularly to a light compensating system which is able to provide uniform image brightness and a method thereof.

Description of the Related Art

In the image capturing area, how to capture a clear image is the most important topic for various image processing techniques applying to the captured image. In the low light environment, it is common to use auxiliary illuminating equipments for light compensation to capture a clearer image. However, the learned method may result in overexposure when the captured object (foreground object) is too close to the light source.

A technique is provided in order to solve the said problem, and the technique is using automatic exposure algorithm (AE algorithm) to determine the brightness of the environment. Related to the overexposure situation, the algorithm reduces the luminous intensity of the light emitting device to improve the overexposure problem of the foreground object. However, when the overexposure problem of the foreground object is solved, it may also create an underexposure problem of the background image due to the reduced brightness of the whole environment. Therefore, in the light compensation area, an adequate light compensating method for both foreground objects and the background image is still absent.

SUMMARY OF THE INVENTION

According the aforementioned problem, the present disclosure provides a light compensating system and a method thereof, using a plurality of light emitting devices and a brightness analysis algorithm to help users to obtain clear image available for recognition, and avoiding the overexposure or underexposure problem of the foreground object/background image.

The present invention discloses a light compensating system comprising a plurality of light emitting devices, an image capturing device, and a processing device. The processing device is coupled with the plurality of light emitting devices and the image capturing device respectively. Each of the light emitting devices is adapted for emitting light and producing a beam pattern to illuminate different areas. The image capturing device is adapted for capturing a first image. The first image comprises a plurality of image blocks and each of the image blocks is affected by the light from at least one corresponding light emitting device. The processing device is adapted for analyzing a brightness value of the at least one image block and adjusting the at least one light emitting device corresponding to the analyzed image block based on the brightness value.

The present invention discloses a light compensating method comprising using a plurality of light emitting devices to emit light and produce beam pattern for illumination, and capturing a first image. The first image comprises a plurality of image blocks and each of the image blocks is affected by the light from at least one corresponding light emitting device. Then the method analyzes a brightness value of the at least one image block and adjusts the at least one light emitting device corresponding to the analyzed image block based on the brightness value.

According to the light compensating system and the method thereof, an algorithm is used to analyze the brightness value of a image block in the image, and according to the brightness value of the image block, it adjusts the luminous intensity, beam pattern, or illumination area . . . etc, properties of the light emitting device used for illumination in the block to obtain a clear image available for recognition. Therefore, in the image, the problem of overexposure, underexposure, or uneven exposure in the image blocks can be avoided.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The same or similar components are represented with same symbols in the following embodiments.

Figure 1:
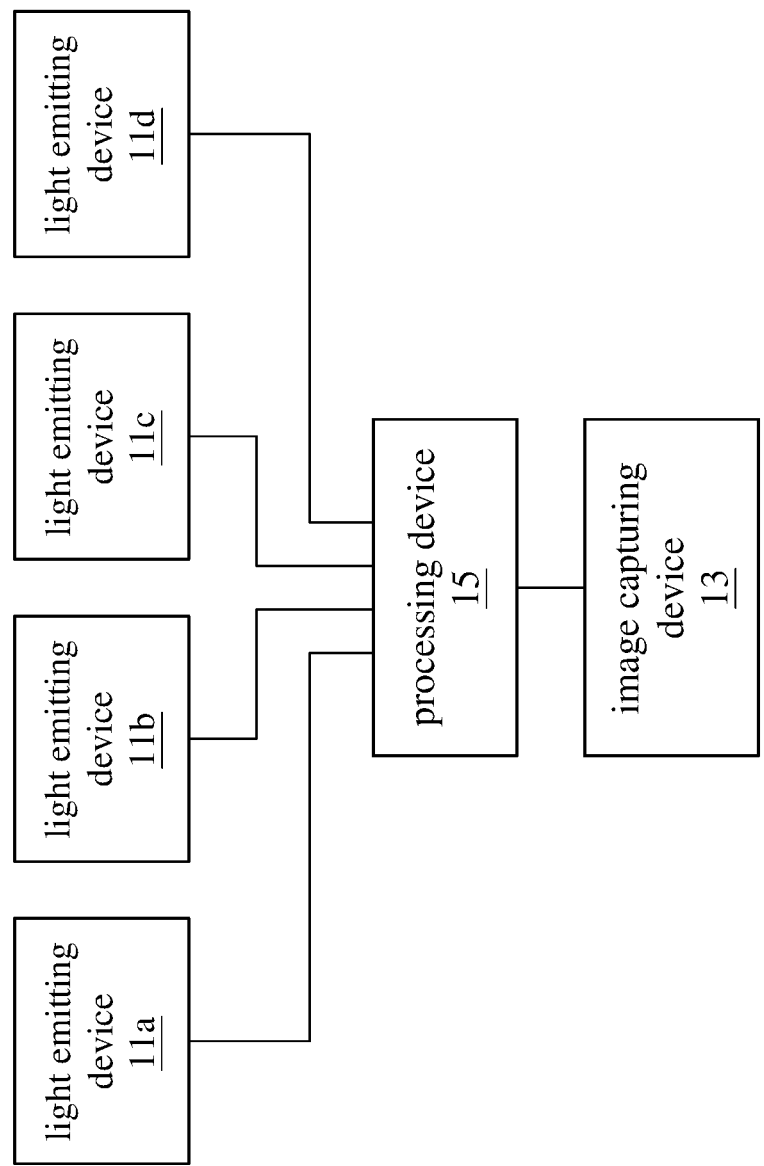
FIG. 1 is a functional block diagram of the light compensating system according to an embodiment of the present invention.

Please refer to FIG. 1. FIG. 1 is a functional block diagram of the light compensating system according to an embodiment of the present invention. As shown in FIG. 1, the light compensating system 1 comprises a plurality of light emitting device 11a to 11d, an image capturing device 13, and a processing device 15. The processing device 15 is respectively coupled with the plurality of light emitting devices 11a to 11d and the image capturing device 13.

Figure 2:
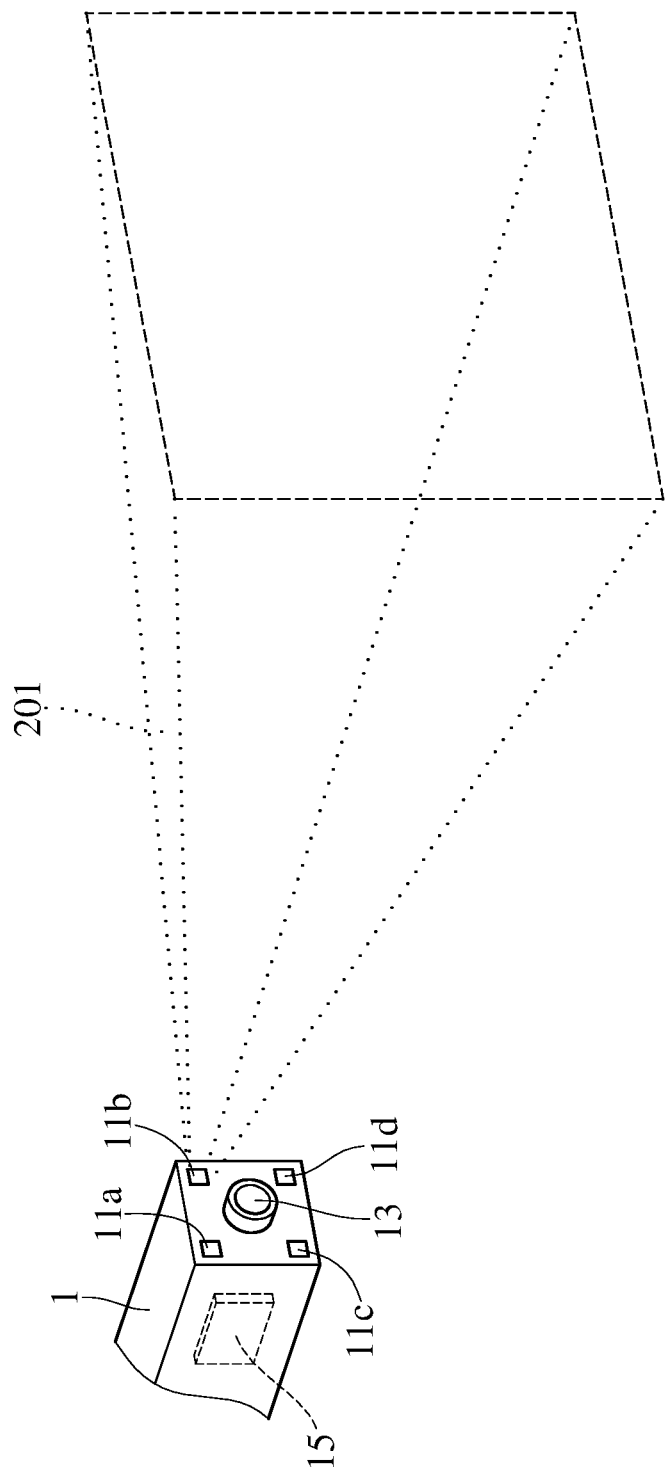
FIG. 2 is used to explain the operating method of a light emitting device in the light compensating system according to an embodiment of the present invention.

Each light emitting device of the plurality of light emitting devices 11a to 11d is adapted for emitting light to illuminate different areas. Practically, each light emitting device of the light emitting devices 11a to 11d emits light to a certain area in the space. For example, please refer to FIG. 2. FIG. 2 is used to explain the operating method of a light emitting device in the light compensating system according to an embodiment of the present invention. As shown in FIG. 2, when the light emitting device 11b emits light, the area 201 in the space is illuminated. Besides, the luminous status of each light emitting device of the light emitting devices 11a to 11d is adjustable.

The luminous status of a light emitting device of the light emitting devices 11a to 11d may at least be the luminous intensity, beam pattern, or illumination area. Taking the light emitting device 11c for example, the light emitting device 11c may comprise a plurality of light emitting units, and the luminous intensity of every light emitting unit is related to the power of that light emitting unit. Therefore, by adjusting the power of every light emitting unit in the light emitting device 11c, the luminous intensity of the light emitting device 11c is adjusted accordingly. Besides, the light emitting device may further comprise at least a lens or at least a light reflector to produce different beam patterns. The light emitting device can produce different beam patterns through different arrangements, such as a rectangular beam pattern, a round beam pattern, an elliptic beam pattern, a polygonal beam pattern, or any other shaped beam pattern. The above beam patterns can be further designed to symmetric or asymmetric.

Figure 3B:
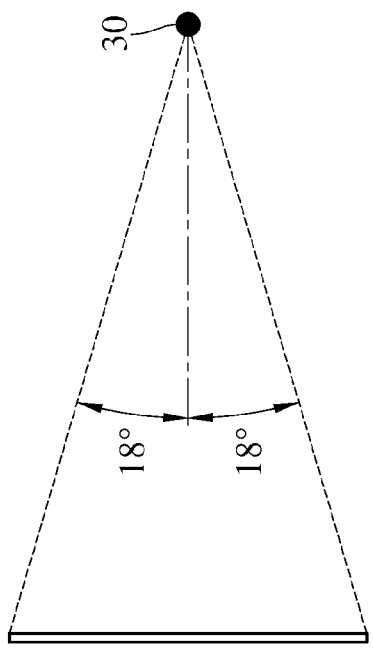
FIG. 3B is a lateral schematic view of a light emitting device with a symmetric rectangular beam pattern used to explain an embodiment of the present invention.
Figure 3A:
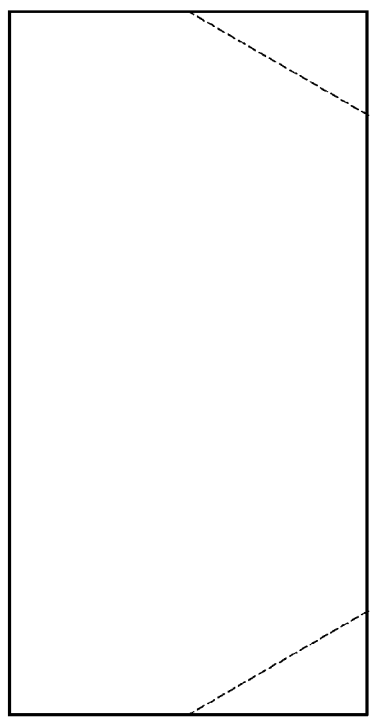
FIG. 3A is a vertical schematic view of a light emitting device with a symmetric rectangular beam pattern used to explain an embodiment of the present invention.
Figure 3D:
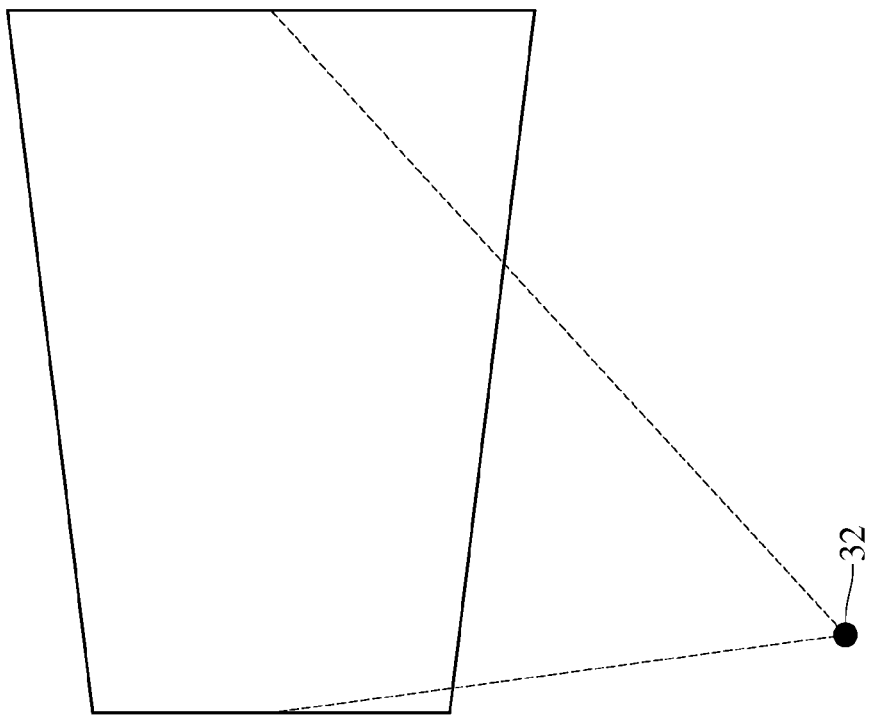
FIG. 3D is a vertical schematic view of a light emitting device with an asymmetric (vertically symmetric and left-right asymmetric) trapezoid beam pattern used to explain an embodiment of the present invention.
Figure 3C:
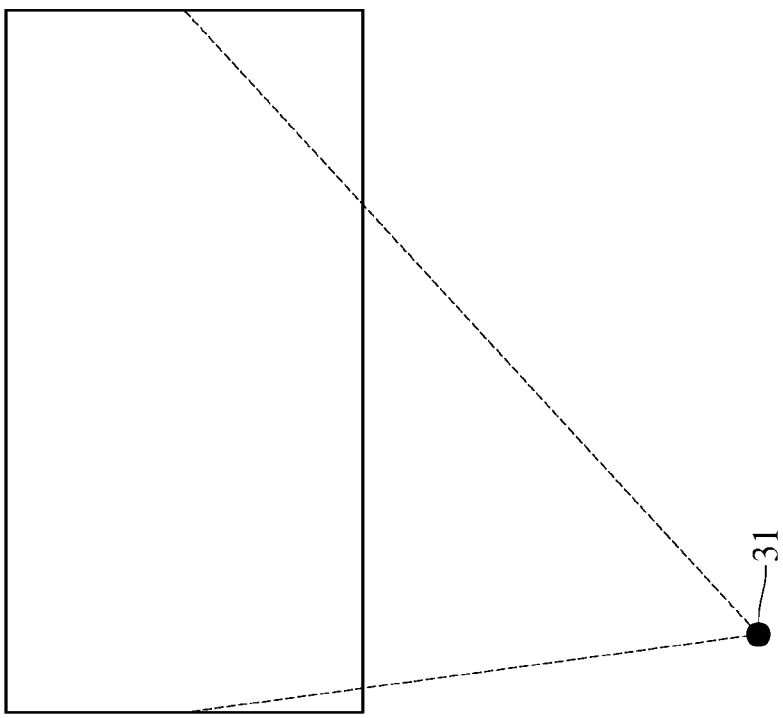
FIG. 3C is a vertical schematic view of a light emitting device with an asymmetric (vertically symmetric and left-right asymmetric) rectangular beam pattern used to explain an embodiment of the present invention.

Taking the light emitting device with a light reflector for example, adopting different designed light reflectors can produce the rectangular beam pattern of different horizontal illumination angles, such as 60 degree, 90 degree, or 120 degree. The light reflector can be further designed to produce the rectangular beam pattern with different ratios, such as 16:9 or 4:3. When adopting different light reflectors, the beam pattern and the illumination area of the light emitting device are adjusted accordingly. For example, please refer to FIG. 3A and FIG. 3B. FIG. 3A is a vertical schematic view of a light emitting device with a symmetric rectangular beam pattern used to explain an embodiment of the present invention. FIG. 3B is a lateral schematic view of a light emitting device with a rectangular beam pattern used to explain an embodiment of the present invention. As shown in FIG. 3A and FIG. 3B, the light emitting device 30 with a symmetric rectangular beam pattern has the horizontal illumination angle of 60 degree (average 30 degree to the left and right of the symmetric light emitting device 30) and the vertical illumination angle of 36 degree (average 18 degree to the top and down of the symmetric light emitting device 30). Therefore, the light emitting device 30 has a symmetric rectangular beam pattern of 16:9 and a horizontal illumination angle of 60 degree. In another embodiment, please refer to FIG. 3C and FIG. 3D. When the light emitting device comprises an asymmetric (vertically symmetric and horizontally asymmetric) light reflector, the light emitting device 31 shown in FIG. 3C emits a rectangular beam pattern, or shown in FIG. 3D, the light emitting device 32 emits a trapezoid beam pattern. The light reflector of the light emitting device can be designed according to the needs by person skilled in the art and is not limited to the present embodiment.

Except using the above method to produce different beam patterns with different lenses or different light reflectors, the light emitting device is similar to a lamp with adjustable emission direction function, so that the illumination area of every light emitting device is also adjustable. For example, the light emitting devices 11a to 11d include but not limited to IR LED, white light LED, or any other illumination device.

Figure 4A:
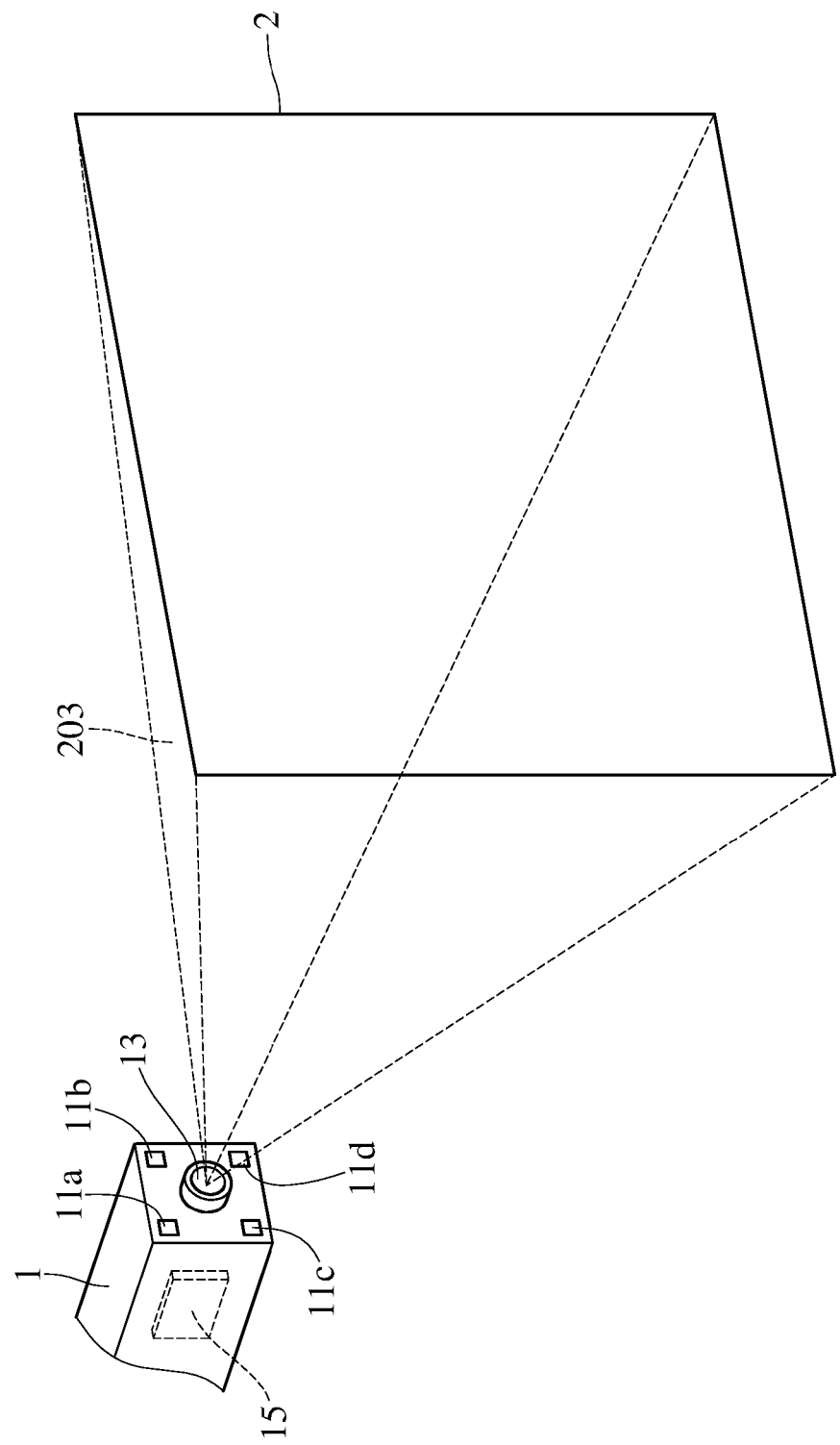
FIG. 4A is a schematic view of the operation of the light compensating system according to an embodiment of the present invention.
Figure 4B:
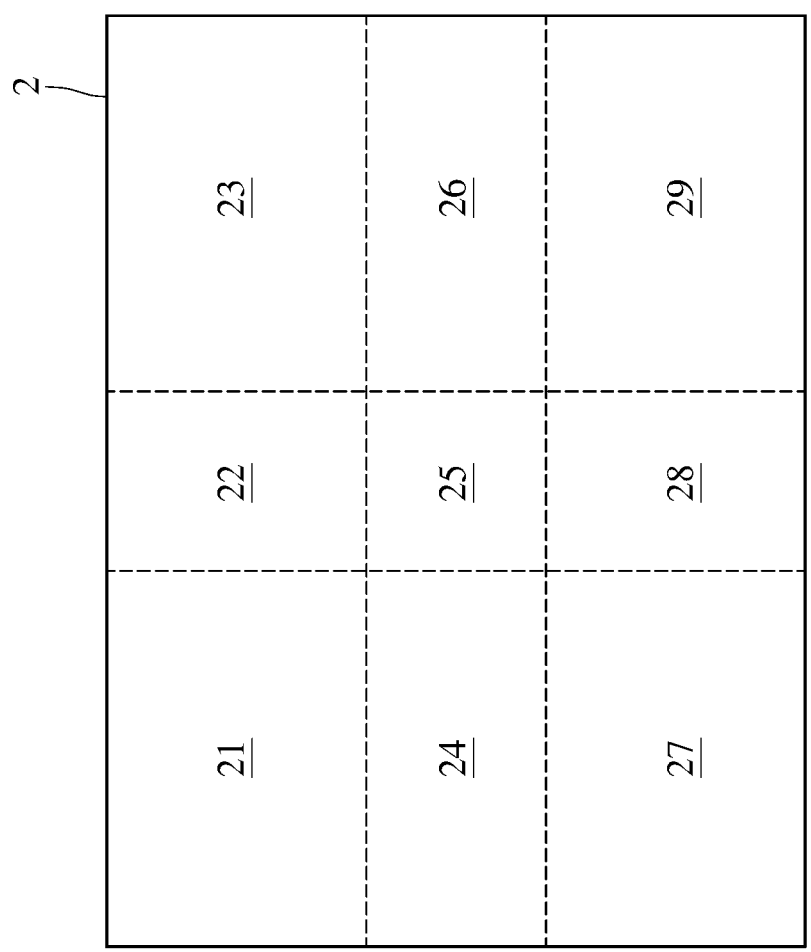
FIG. 4B is a schematic view of the first image captured by the image capturing device in FIG. 4A.

Please refer to FIG. 4A and FIG. 4B together. FIG. 4A is a schematic view of the operation of the light compensating system according to an embodiment of the present invention. FIG. 4B is a schematic view of the first image captured by the image capturing device in FIG. 4A. The image capturing device 13 is used to capture a first image 2 from an area 203 in the space. The first image 2 comprises a plurality of image blocks 21 to 29, and every image block (ex: the image block 21) of the plurality of image blocks 21 to 29 is affected by the light from at least one corresponding light emitting device of the said plurality of light emitting devices 11a to 11d. The image capturing device 13 includes but not limited to network camera, closed circuit television (CCTV) camera, digital camera, digital video recorder, or any other equipment suitable for capturing image.

Figure 4C:
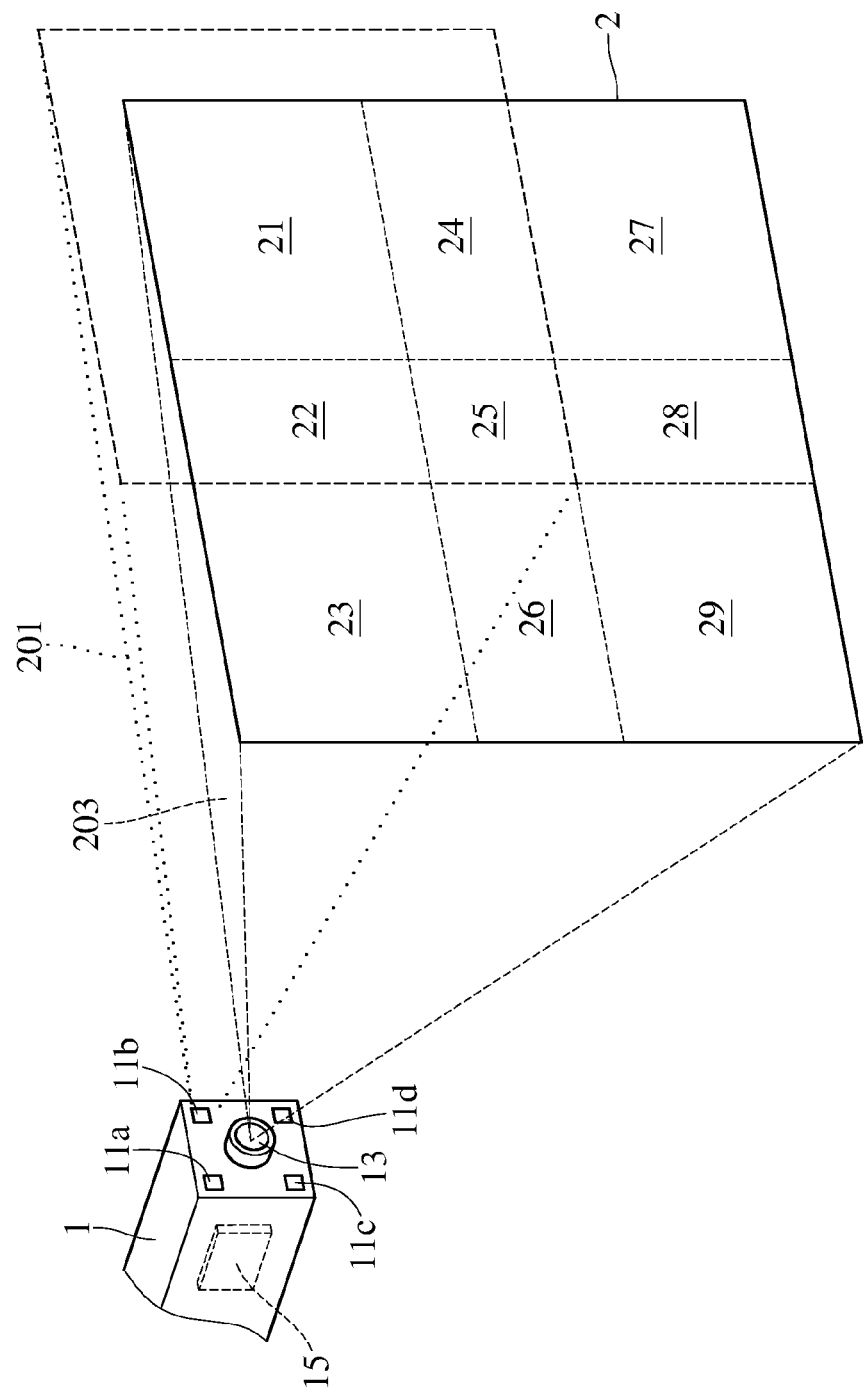
FIG. 4C to 4F are used to explain the relationships between each image block and each light emitting device.
Figure 4D:
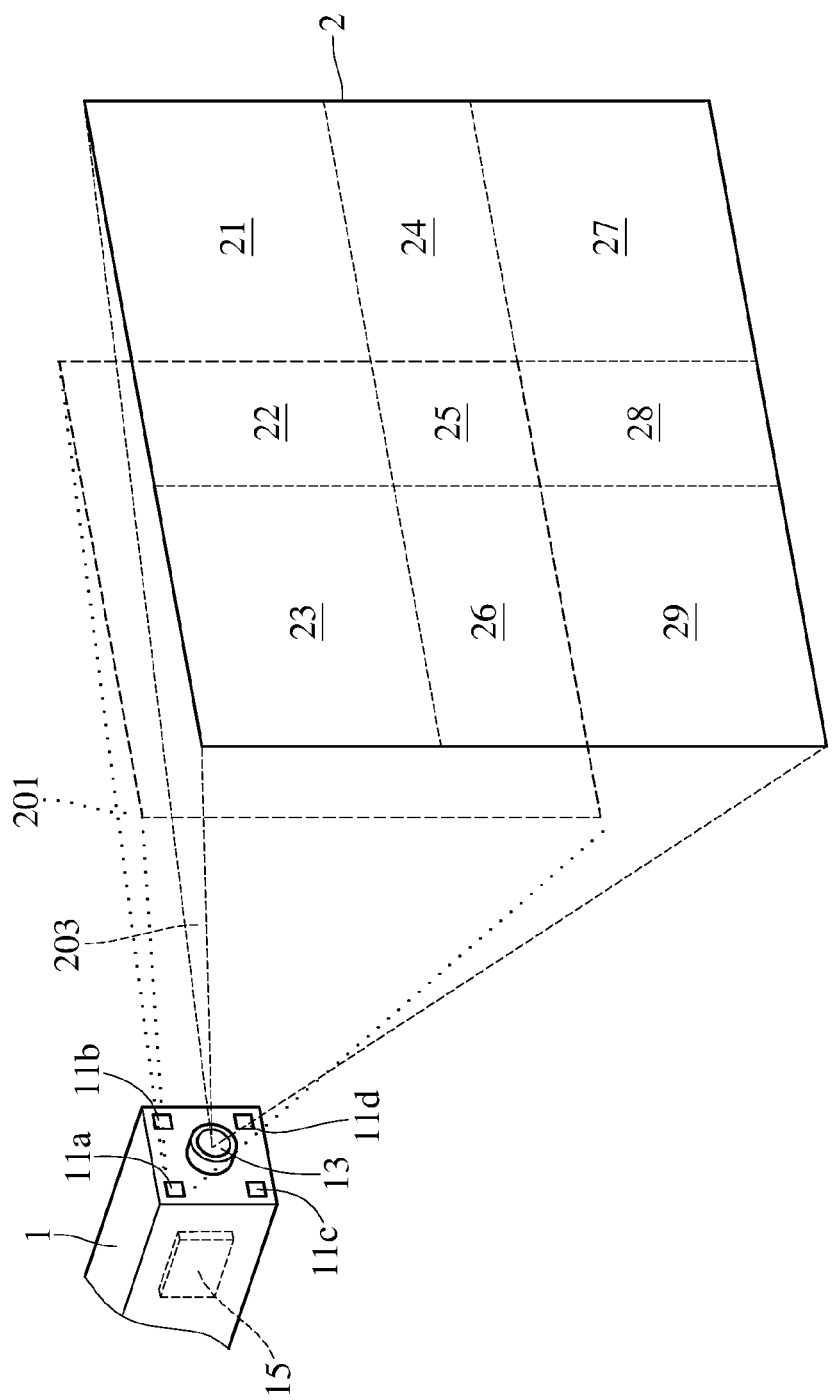
Figure 4E:
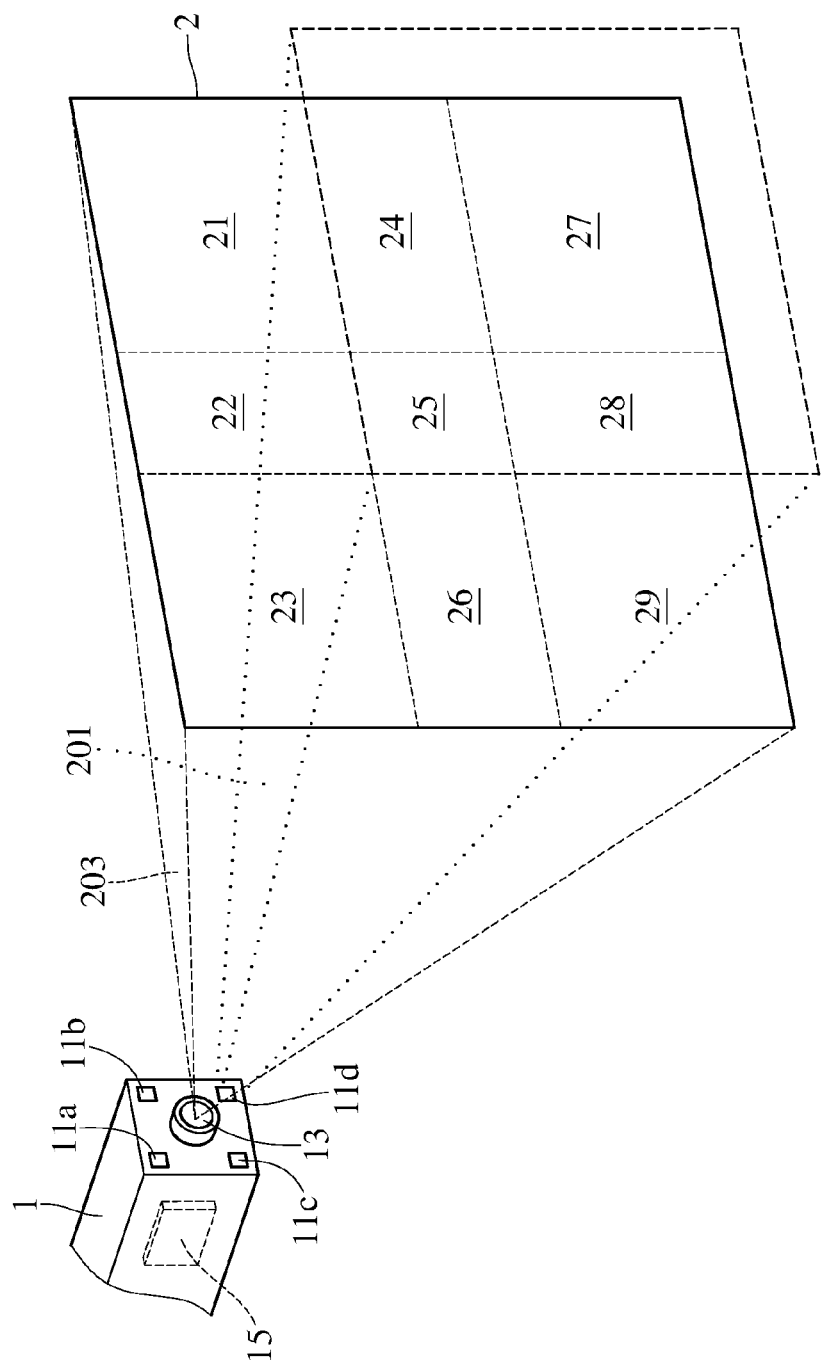
Figure 4F:
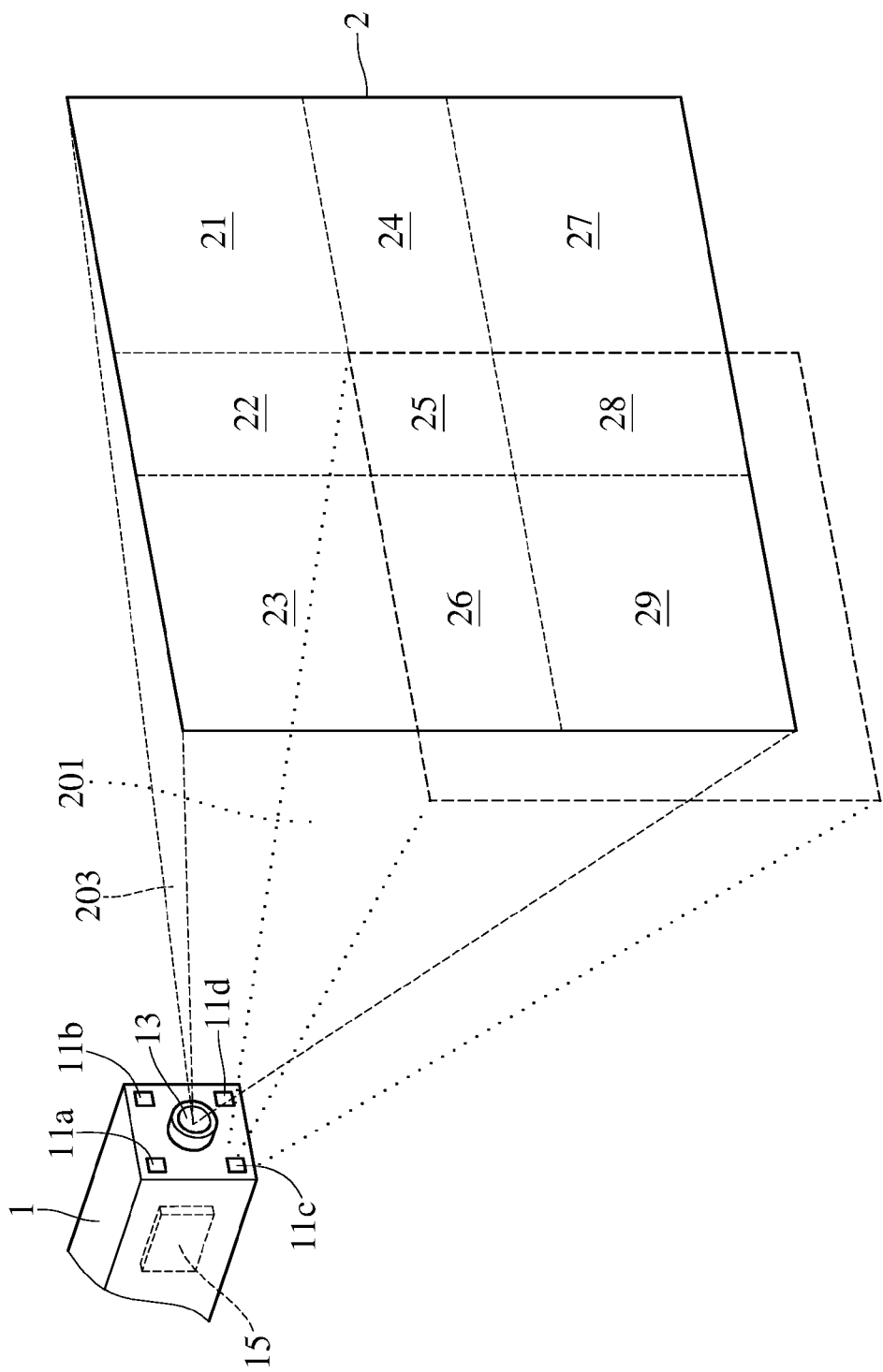

As shown in FIG. 4B to FIG. 4F, FIG. 4C to FIG. 4F are used to explain the relationship between every image block and every light emitting device. As shown in FIG. 4B, the first image 2 can be approximately divided into the image blocks 21 to 29 and each of the image blocks is affected by the light of at least one light emitting device of the light emitting devices 11a to 11d. For example, as shown in FIG. 4C, the light emitted from the light emitting device 11b affects the upper left corner of the image 2, i.e., the image block 21, 22, 24, and 25. As shown in FIG. 4D, the light emitted from the light emitting device 11a affects the upper right corner of the image 2, i.e., the image block 22, 23, 25, and 26. As shown in FIG. 4E, the light emitted from the light emitting device 11d affects the lower left corner of the image 2, i.e., the image block 24, 25, 27, and 28. As shown in FIG. 4F, the light emitted from the light emitting device 11c affects the lower right corner of the image 2, i.e., the image block 25, 26, 28, and 29. In other words, to adjust the brightness value of the image block 21 only needs to adjust the luminous status of the light emitting device 11b, and to adjust the brightness value of the image block 25 may adjust the luminous status of any or multiple light emitting devices of the light emitting devices 11a to 11d, or adjust all the luminous status of the four light emitting devices.

The processing device 15 is used to analyze the brightness value of at least one image block of the plurality of image blocks 21 to 29, and to adjust the luminous status of at least one light emitting device corresponding to the analyzed image block in the plurality of light emitting devices 11a to 11d, according to the obtained brightness value from the analysis. For example, when analyzing the image block 23, the processing device 15 can adjust the luminous status of the light emitting device 11a corresponding to the image block 23 according to the average brightness value of the image block 23. For example, the processing device 15 includes but not limited to application-specific integrated circuit (ASIC), field programmable gate array (FPGA), central processing unit, (CPU), single chip controller, or any other equipment suitable for executing arithmetic and control instructions.

In an embodiment, the processing device 15 can set a brightness value threshold and decide whether the average brightness value is too low or too high according to the average brightness value that is higher/lower than the brightness value threshold. In another embodiment, the processing device 15 can set two brightness value thresholds by defining a first brightness interval between these two brightness value thresholds. Then the processing device 15 determines whether the average brightness value of the image block 23 is within the first brightness interval to generate a comparison result. When the comparison result indicates that the average brightness value of the image block 23 is within the first brightness interval, the processing device 15 does not adjust the luminous status of the light emitting device 11a corresponding to the image block 23. When the comparison result indicates that the average brightness value of the image block 23 is lower than the first brightness interval, the processing device 15 adjusts the luminous status of the light emitting device 11a corresponding to the image block 23 to enhance the average brightness value of the image block 23. When the comparison result indicates that the average brightness value of the image block 23 is higher than the first brightness interval, the processing device 15 adjusts the luminous status of the light emitting device 11a corresponding to the image block 23 to reduce the average brightness value of the image block 23.

In another embodiment, when analyzing the image block 25, the processing device 15 can adjust at least one light emitting device of the light emitting devices 11a to 11d corresponding to the analyzed image block 25 based on the brightness distribution of the image block 25. Please refer to FIG. 5A. FIG. 5A is a brightness distribution diagram of an image block used to explain an embodiment of the present invention. As shown in FIG. 5A, the image block 25 in the first image 2 is further analyzed by the processing device 15.

In this embodiment, the processing device 15 sets a brightness value threshold to the image block 25 and determines the bright blocks (the blocks with brightness values higher than the brightness value threshold) and the dark blocks (the blocks with brightness values lower than the brightness value threshold) according to the brightness value threshold. Assuming that the sub image block 251 and the sub image block 254 of the image block 25 are determined as the bright blocks, and the sub image block 252 and the sub image block 253 of the image block 25 are determined as the dark blocks, because the sub image block 251 and the image block 21 are closer, then the processing device 15 determines that the relationship between the sub image block 251 and the light emitting device 11b is higher. Likewise, because the sub image block 254 and the image block 29 are closer, then the processing device 15 determines that the relationship between the sub image block 254 and the light emitting device 11c is higher. Therefore, the processing device 15 reduces the luminous intensity of the light emitting device 11b and 11c to reduce the brightness value of the sub image block 251 and 254. Likewise, because the sub image block 252 and the image block 23 are closer, then the processing device 15 determines that the relationship between the sub image block 252 and the light emitting device 11a is higher. The sub image block 253 and the image block 27 are closer, so the processing device 15 determines that the relationship between the sub image block 253 and the light emitting device 11d is higher. Therefore, the processing device 15 enhances the luminous intensity of the light emitting device 11a and 11d to increase the brightness value of the sub image block 252 and 253.

Figure 5B:
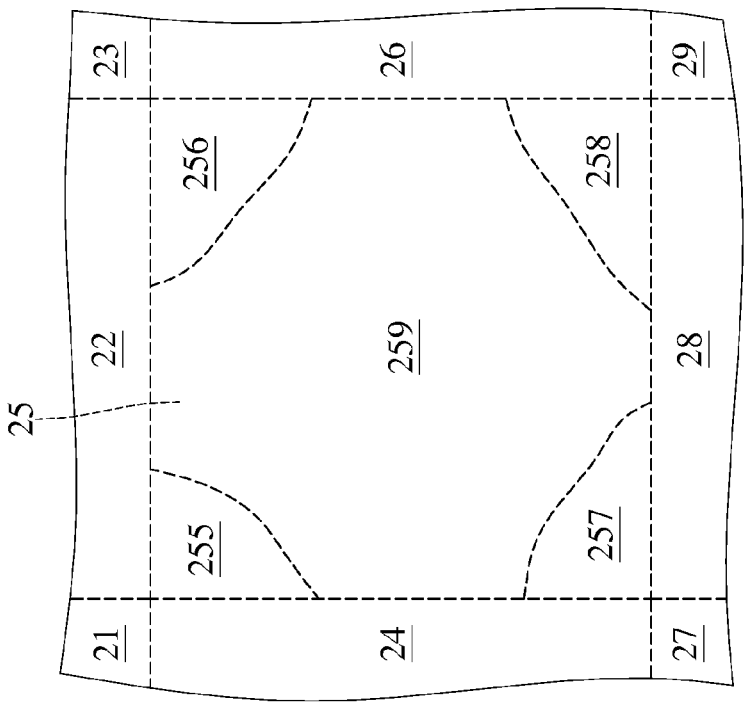
FIG. 5B is a brightness distribution diagram of an image block used to explain another embodiment of the present invention.
Figure 5A:
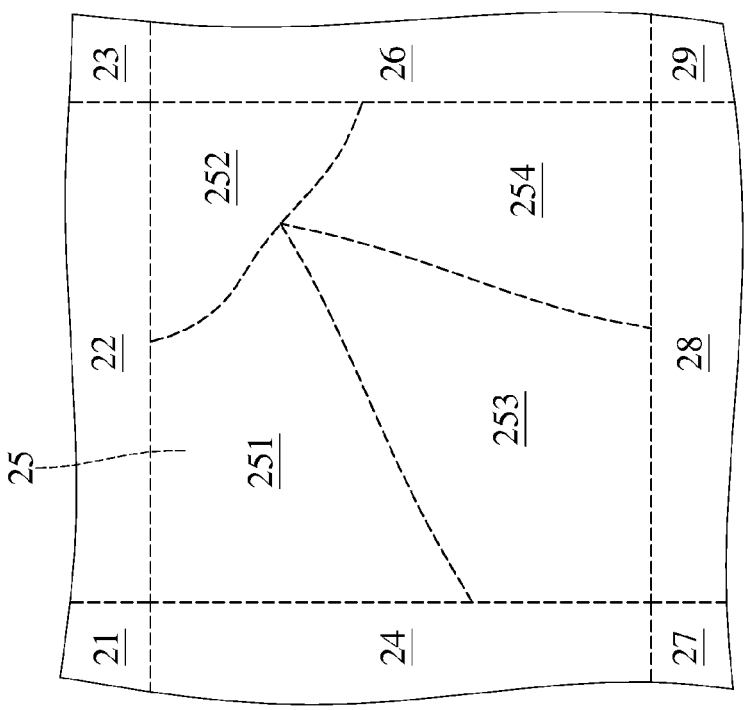
FIG. 5A is a brightness distribution diagram of an image block used to explain an embodiment of the present invention.

In another embodiment, please refer to FIG. 5B. FIG. 5B is a brightness distribution diagram of an image block used to explain another embodiment of the present invention. As shown in FIG. 5B, the image block 25 of the first image 2 is further analyzed by the processing device 15. In this embodiment, the processing device 15 sets two brightness value thresholds to the image block 25. When the brightness value of a pixel is between the two brightness value thresholds, then the brightness of the pixel is determined as appropriate by the processing device 15. When the brightness value of a pixel is higher than the two brightness value thresholds, then the brightness of the pixel is determined as over luminous by the processing device 15. When the brightness value of a pixel is lower than the two brightness value thresholds, then the brightness of the pixel is determined as under luminous by the processing device 15. Then the over-luminous blocks (with the brightness values higher than the two brightness value thresholds), under-luminous blocks (with the brightness values lower than the two brightness value thresholds), and the appropriate blocks (with the brightness values between the two brightness value thresholds) in the image block 25 can be determined by the processing device 15.

Assuming that the sub image block 255 and the sub image block 256 of the image block 25 are determined as under-luminous blocks by the processing device 15, sub image block 257 and the sub image block 258 of the image block 25 are determined as over-luminous blocks by the processing device 15, and the sub image block 259 is determined as appropriate block by the processing device 15, because the sub image block 255 has a closer relationship with the light emitting device 11b, the sub image block 256 has a closer relationship with the light emitting device 11a, the sub image block 257 has a closer relationship with the light emitting device 11d, the sub image block 258 has a closer relationship with the light emitting device 11c, and the sub image block 259 has relationships with the light emitting devices 11a to 11d, under the premise without making huge adjustment on the brightness value of the sub image block 259, the processing device 15 adjusts the beam pattern of the light emitting devices 11a and 11b (ex: adjusting the beam pattern with horizontal illumination angle 60 degree to the beam pattern with horizontal illumination angle 90 degree) and/or enhance the luminous intensity to increase the brightness values of the sub image blocks 255 and 256. At the same time, the processing device 15 adjusts the beam pattern of the light emitting devices 11c and 11d (ex: adjusting the beam pattern with horizontal illumination angle 90 degree to the beam pattern with horizontal illumination angle 60 degree) and/or reduce the luminous intensity to decrease the brightness values of the sub image blocks 257 and 258.

In another embodiment of the present invention, please refer to FIG. 4A and FIG. 4B. In the first image 2, there is a correlation coefficient between each image block and each light emitting device of the light compensating system 1. For example, the correlation coefficients between the image block 29 and the light emitting devices 11a to 11d respectively are 0.5, 0.2, 1, and 0.5. These correlation coefficients respectively represent the relationships between the image block 29 and each light emitting device of the light emitting devices 11a to 11d. The higher correlation coefficient represents that the luminous status of the corresponding light emitting device has more influence on the image block. Specifically, the luminous status of the light emitting device 11c influences the image block 29 most and the luminous status of the light emitting device 11b influences the image block 29 least.

In this embodiment, the relationship between an image block (ex: the image block 27) and the light emitting device 11d can be simply described as the following equation (1).

$$L_{27} = I_{11d} \cdot R_{27\_11d} \quad (1)$$

In equation (1), $L_{27}$ is the average brightness value of the image block 27, $I_{11d}$ is the luminous intensity of the light emitting device 11d, and $R_{27\_11d}$ is the correlation coefficient of the image block 27 and the light emitting device 11d.

Specifically, the average brightness value of the image block 27 can be simply described as the following linear transformation equation (2):

$$L_{27} = I_{11a} \cdot R_{27\_11a} + I_{11b} \cdot R_{27\_11b} + I_{11c} \cdot R_{27\_11c} + I_{11d} \cdot R_{27\_11d} \quad (2)$$

, wherein $L_{27}$ is the average brightness value of the image block 27, $I_{11a}$ to $I_{11d}$ are the luminous intensity of the light emitting devices 11a to 11d respectively, and $R_{27\_11a}$ to $R_{27\_11d}$ are the correlation coefficients between the image block 27 and the light emitting devices 11a to 11d respectively. The processing device 15 can build a linear equation for every image block of the first image 2 such as equation (2), and multiple linear equations can form a transformation matrix. The processing device 15 can adjust at least one light emitting device of the light emitting devices 11a to 11d according to the transformation matrix, the luminous status (such as luminous intensity, beam pattern, or illumination area) of one or multiple light emitting devices of the light emitting devices 11a to 11d, and the brightness value of at least one image block in the first image 2. Except the said average brightness value, center weighting or object oriented weighting can be used to calculate the brightness value of the image block.

When every time the processing device 15 adjusts a luminous status of at least one light emitting device corresponding to the image block (ex: the image block 27) according to the said equation (2) or said transformation matrix, the processing device 15 can update the correlation coefficients of every corresponding light emitting device related to the image block, according to the variation of the brightness value of the image block (i.e. the image block 27) and the correlation coefficient of the corresponding light emitting device related to the image block before the adjustment.

In an embodiment, in the first image 2, the image block can be appropriately divided according to the user scenario, the supporting computation complexity of the processing device 15, the number of the light emitting devices, and the desired brightness uniformity of the screen. The size and shape of every image block is not limited in the present invention.

Figure 6:
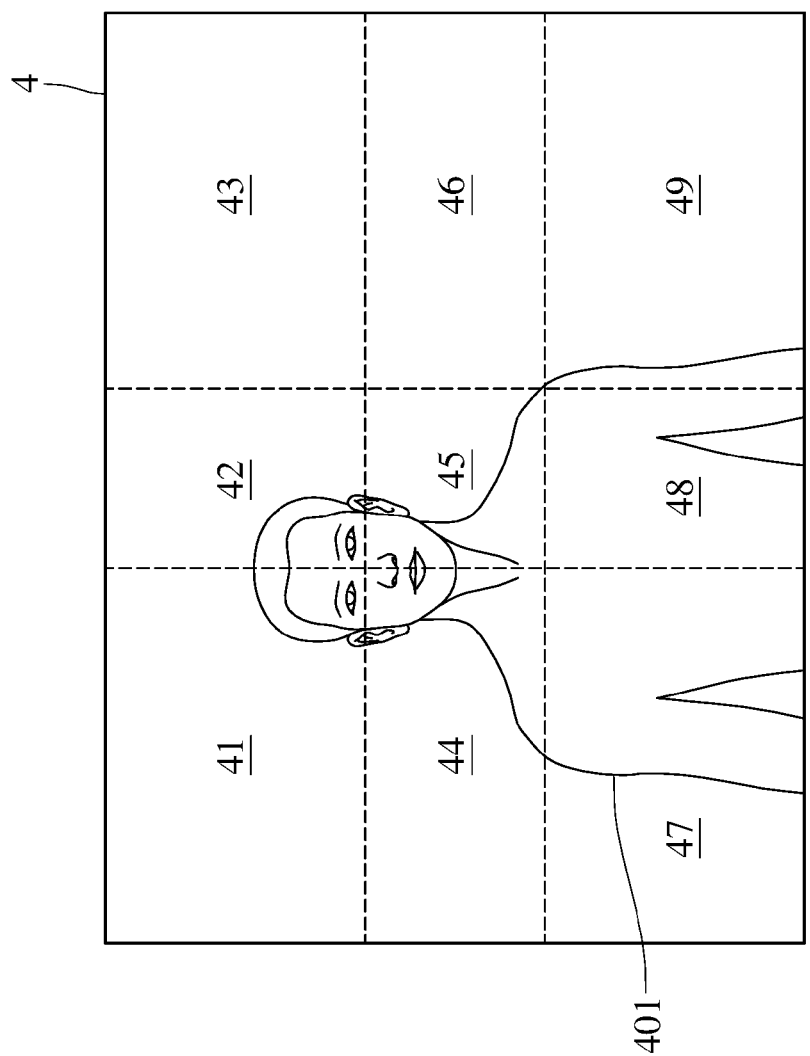
FIG. 6 is a schematic view of the image according to an embodiment of the present invention.

In a further embodiment, please refer to FIG. 6. FIG. 6 is a schematic view of the image according to an embodiment of the present invention. As shown in FIG. 6, the image 4 is divided to the image blocks 41 to 49, wherein the processing device 15 executes an object recognition procedure for the image 4 to extract a foreground object 401. The foreground object 401 is located in the image block 41, the image block 42, the image block 44, the image block 45, the image block 47 and the image block 48. Then the processing device 15 analyzes one of the image blocks containing part of the foreground object 401. For example, the processing device 15 analyzes the image block 48 and then adjusts one or multiple light emitting devices (ex: the light emitting device 11d) corresponding to the image block 48 according to the average brightness value or brightness distribution of the image block 48. The method is described as FIG. 4A and 4B and will not be repeated here.

In an embodiment, when the foreground object 401 in the image 4 is recognized and the brightness value of the image blocks containing the foreground object 401 (the image block 41, 42, 44, 45, 47, and 48) are adjusted, the processing device 15 sets the average brightness value of the foreground object 401 as a dynamic brightness threshold value. Then the processing device 15 analyzes the image block 43, 46, and 49 which does not contain the foreground object 401, and compares the average brightness value of one of these image blocks (ex: the image block 46) with the said dynamic brightness threshold value to decide whether the average brightness value of the image block 46 is too low or too high to adjust the luminous status of the light emitting devices (ex: the light emitting device 11a and 11c) corresponding to the image block 46, such as the luminous intensity, beam pattern, or illumination area.

Figure 7:
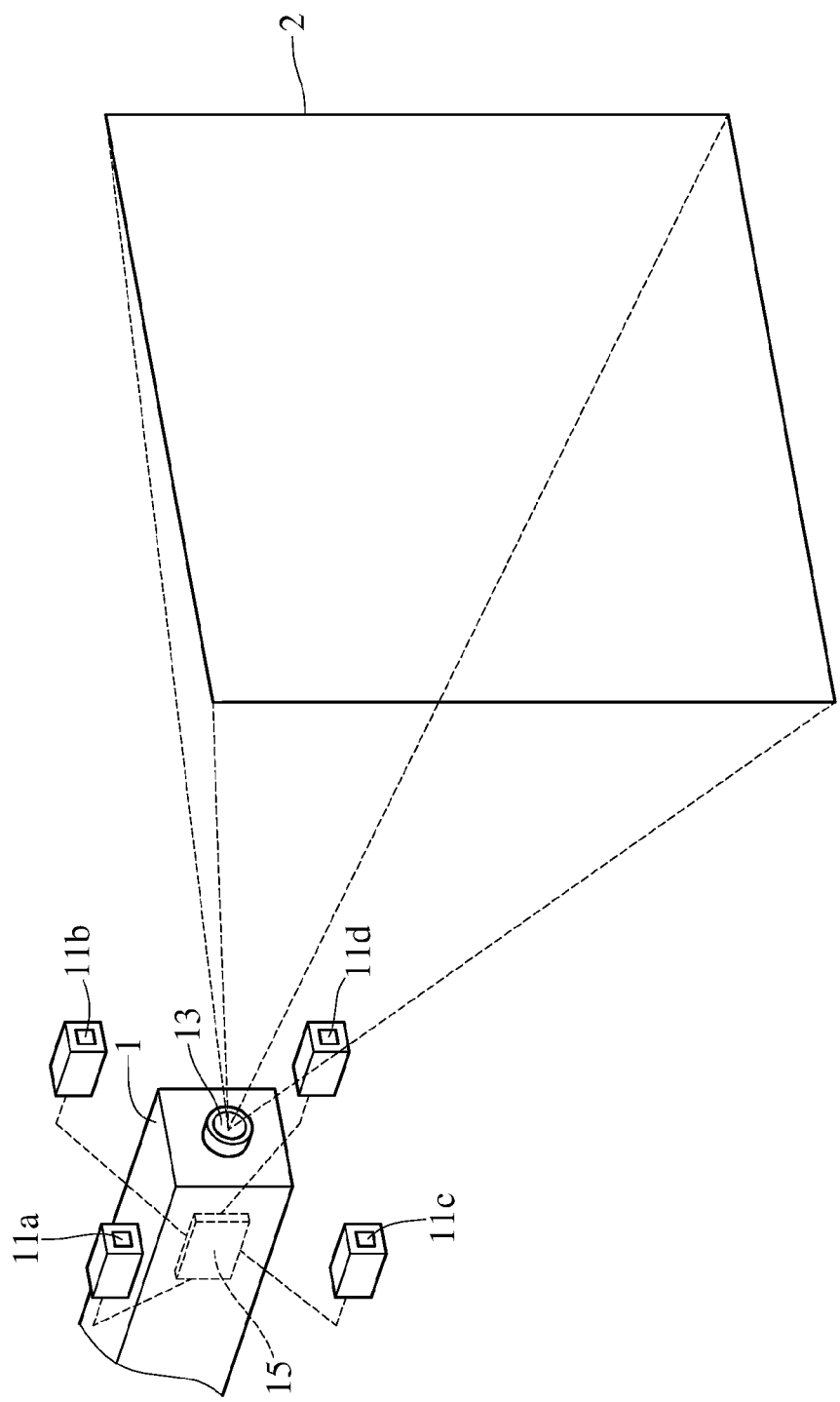
FIG. 7 is a schematic view of the light compensating system according to another embodiment of the present invention.

In another embodiment, please refer to FIG. 7. FIG. 7 is a schematic view of the light compensating system according to another embodiment of the present invention. As shown in FIG. 7, in the light compensating system 1, the light emitting devices 11a to 11d are not directly connected to the image capturing device 13 and/or the processing device 15, but wirelessly coupled with the image capturing device 13 and/or the processing device 15.

Figure 8:
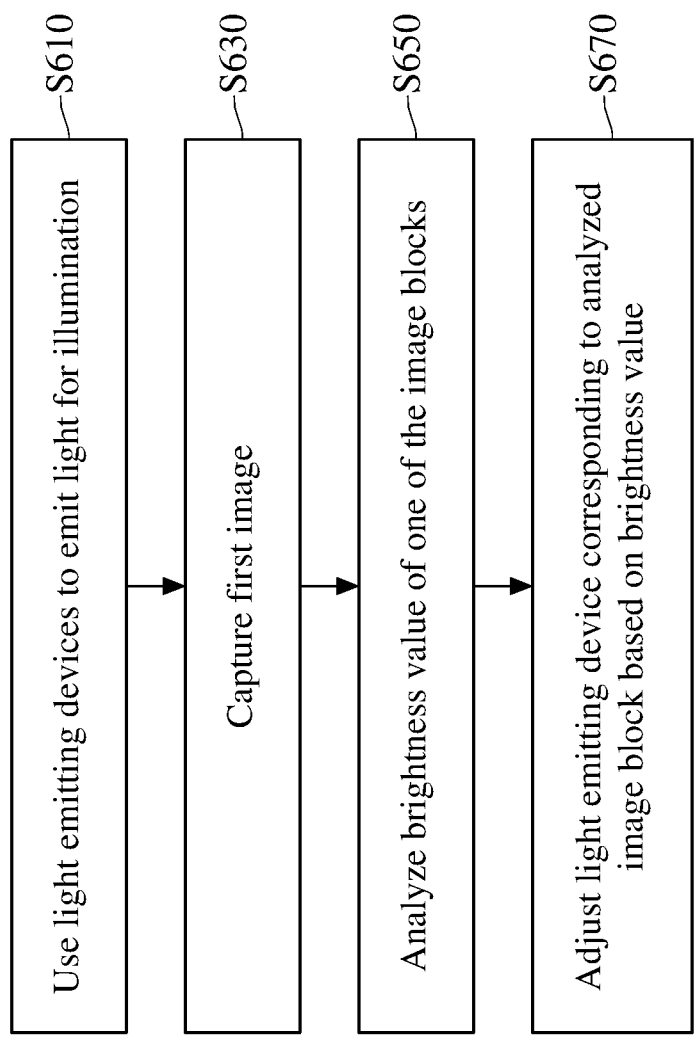
FIG. 8 is a flowchart of the light compensating method according to an embodiment of the present invention.

In an embodiment, please refer to FIG. 1, FIG. 4A, FIG. 4B, and FIG. 8. FIG. 8 is a flowchart of the light compensating method according to an embodiment of the present invention. In the step S610, the method uses the light emitting devices 11a to 11d to emit light for illumination. Then, in the step S630, the method uses the image capturing device 13 to capture a first image 2. Then, in the step S650, the method uses the processing device 15 to analyze a brightness value of one of the image blocks in the first image 2. In this step, the brightness value is the average brightness value or the brightness distribution of the analyzed image block. Then, in the step S670, the method adjusts one or multiple light emitting devices corresponding to the analyzed image block based on the brightness value. In this step, to adjust the light emitting device means adjusting the luminous intensity, beam pattern, and/or the illumination area of the light emitting device.

According to the light compensating system and the method thereof, an algorithm is used to analyze the brightness value of a image block in the image, and according to the brightness value of the image block, it adjusts the luminous intensity, beam pattern, or illumination area . . . etc, properties of the light emitting device used for illumination in the block to obtain a clear image available for recognition. Therefore, in the image, the problem of overexposure, underexposure, or uneven exposure in the image blocks can be avoided.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A light compensating system, comprising:
   a plurality of light emitting devices, each of the light emitting devices adapted for emitting light and producing a beam pattern to illuminate different areas;
   an image capturing device adapted for capturing a first image, wherein the first image comprises a plurality of image blocks and each of the image blocks is affected by the light from at least one corresponding light emitting device; and
   a processing device adapted for analyzing brightness values of a first area and a second area, adjusting at least one first light emitting device of the light emitting devices corresponding to the first area in a first adjusting procedure based on the brightness value of the first area, and adjusting at least one second light emitting device of the light emitting devices corresponding to the second area in a second adjusting procedure according to the first area;
   wherein the first area includes at least one image block of the plurality of image blocks, the second area includes at least one other image block of the plurality of image blocks not in the first area.

2. The light compensating system of claim 1, wherein the processing device further determines whether the brightness value of the first area is within a first brightness interval to generate a first comparison result, and further adjusts the at least one first light emitting device corresponding to the first area in the first adjusting procedure according to the first comparison result.

3. The light compensating system of claim 1, wherein the processing device further adjusts the at least one second light emitting device corresponding to the second area in the second adjusting procedure based on the adjusted brightness value of the first area.

4. The light compensating system of claim 3, wherein the processing device further set a dynamic brightness threshold value based on the adjusted brightness value of the first area, analyzes the brightness value of the second area, and further adjusts the at least one second light emitting device corresponding to the second area in the second adjusting procedure according to the dynamic brightness threshold value and the brightness value of the second area.

5. The light compensating system of claim 1, wherein the beam pattern produced by the light emitting devices is a symmetric beam pattern.

6. The light compensating system of claim 1, wherein the beam pattern produced by the light emitting devices is an asymmetric beam pattern.

7. The light compensating system of claim 1, wherein the processing device further executes an object recognition procedure for the first image to extract a foreground object, and analyzes the brightness value of the first area containing the foreground object, and further adjusts the at least one first light emitting device corresponding to the first area in the first adjusting procedure based on the brightness value of the first area.

8. The light compensating system of claim 7, wherein the processing device further determines whether the brightness value of the first area containing the foreground object is within a second brightness interval to generate a second comparison result, and further adjusts the at least one first light emitting device corresponding to the first area in the first adjusting procedure according to the second comparison result.

9. The light compensating system of claim 7, wherein the processing device further adjusts the at least one second light emitting device corresponding to the second area not containing the foreground object in the second adjusting procedure based on the adjusted brightness value of the first area.

10. The light compensating system of claim 1, wherein the processing device adjusts the at least one first light emitting device corresponding to the first area, including adjusting at least one of a luminous intensity, a beam pattern, and an illumination area of the at least one first light emitting device, and the processing device adjusts the at least one second light emitting device corresponding to the second area, including adjusting at least one of a luminous intensity, a beam pattern, and an illumination area of the at least one second light emitting device.

11. A light compensating method, comprising:
    using a plurality of light emitting devices to emit light and produce beam pattern for illumination;
    capturing a first image, wherein the first image comprises a plurality of image blocks and each of the image blocks is affected by the light from at least one corresponding light emitting device;
    analyzing brightness values of a first area and a second area; and
    adjusting at least one first light emitting device of the light emitting devices corresponding to the first area in a first adjusting procedure based on the brightness value of the first area;
    adjusting at least one second light emitting device of the light emitting devices corresponding to the second area in a second adjusting procedure according to the first area;
    wherein the first area includes at least one image block of the plurality of image blocks, the second area includes at least one other image block of the plurality of image blocks not in the first area.

12. The light compensating method of claim 11, wherein adjusting the at least one first light emitting device of the light emitting devices corresponding to the first area in the first adjusting procedure based on the brightness value of the first area comprises:
    determining whether the brightness value of the first area is within a first brightness interval to generate a first comparison result; and
    adjusting the at least one first light emitting device corresponding to the first area in the first adjusting procedure according to the first comparison result.

13. The light compensating method of claim 11, wherein adjusting the at least one second light emitting device of the light emitting devices corresponding to the second area in the second adjusting procedure according to the first area comprises:

adjusting the at least one second light emitting device corresponding to the second area in the second adjusting procedure based on the adjusted brightness value of the first area.

14. The light compensating method of claim 13, wherein adjusting at least one second light emitting device corresponding to the second area in the second adjusting procedure based on the adjusted brightness value of the first area comprises:
    setting a dynamic brightness threshold value based on the adjusted brightness value of the first area;
    analyzing the brightness value of the second area; and
    adjusting the at least one second light emitting device corresponding to the second area in the second adjusting procedure according to the dynamic brightness threshold value and the brightness value of the second area.

15. The light compensating method of claim 11, wherein the beam pattern produced by the light emitting devices is a symmetric beam pattern.

16. The light compensating method of claim 11, wherein the beam pattern produced by the light emitting devices is an asymmetric beam pattern.

17. The light compensating method of claim 11, further comprising:
    executing a object recognition procedure for the first image to extract a foreground object;
    analyzing the brightness value of the first area containing the foreground object; and
    adjusting the at least one first light emitting device corresponding to the first area in the first adjusting procedure based on the brightness value of the first area.

18. The light compensating method of claim 17, wherein adjusting the at least one first light emitting device of the light emitting devices corresponding to the first area in the first adjusting procedure based on the brightness value of the first area comprises:
    determining whether the brightness value of the first area containing the foreground object is within a second brightness interval to generate a second comparison result; and
    adjusting the at least one first light emitting device corresponding to the first area in the first adjusting procedure according to the second comparison result.

19. The light compensating method of claim 17, wherein adjusting the at least one second light emitting device of the light emitting devices corresponding to the second area in the second adjusting procedure according to the first area comprises:
    adjusting the at least one second light emitting device corresponding to the second area not containing the foreground object in the second adjusting procedure based on the adjusted brightness value of the first area.

20. The light compensating method of claim 11, wherein adjusting the at least one first light emitting device of the light emitting devices corresponding to the first area in the first adjusting procedure based on the brightness value of the first area includes adjusting at least one luminous intensity, a beam pattern, or an illumination area of the at least one first light emitting device and adjusting the at least one second light emitting device corresponding to the second area includes adjusting at least one of a luminous intensity, a beam pattern, and an illumination area of the at least one second light emitting device.

* * * * *